(12) United States Patent
Howe

(10) Patent No.: US 10,961,950 B2
(45) Date of Patent: Mar. 30, 2021

(54) FAN NACELLE TRAILING EDGE

(71) Applicant: THE BOEING COMPANY, Chicago, IL (US)

(72) Inventor: Sean P. Howe, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 863 days.

(21) Appl. No.: 15/342,694

(22) Filed: Nov. 3, 2016

(65) Prior Publication Data
US 2018/0119640 A1 May 3, 2018

(51) Int. Cl.
| | |
|---|---|
| *F02K 1/18* | (2006.01) |
| *B64D 33/04* | (2006.01) |
| *B64D 27/18* | (2006.01) |
| *B64D 31/06* | (2006.01) |
| *F02K 1/82* | (2006.01) |
| *F04D 29/52* | (2006.01) |
| *F04D 29/54* | (2006.01) |
| *F01D 25/24* | (2006.01) |
| *F04D 27/00* | (2006.01) |
| *F02K 1/12* | (2006.01) |
| *F02K 1/70* | (2006.01) |
| *F02K 1/00* | (2006.01) |
| *F02K 1/30* | (2006.01) |
| *F02K 1/15* | (2006.01) |

(52) U.S. Cl.
CPC ............... *F02K 1/18* (2013.01); *B64D 27/18* (2013.01); *B64D 31/06* (2013.01); *B64D 33/04* (2013.01); *F01D 25/24* (2013.01); *F02K 1/00* (2013.01); *F02K 1/12* (2013.01); *F02K 1/15* (2013.01); *F02K 1/30* (2013.01); *F02K 1/70* (2013.01); *F02K 1/82* (2013.01); *F04D 27/001* (2013.01); *F04D 29/522* (2013.01); *F04D 29/545* (2013.01); *F05D 2220/323* (2013.01); *F05D 2250/324* (2013.01); *F05D 2270/3015* (2013.01)

(58) Field of Classification Search
CPC ..... F02K 1/00; F02K 1/78; F02K 1/82; B64D 27/18; B64D 33/04; F01D 25/24
See application file for complete search history.

(56) References Cited

U.S. PATENT DOCUMENTS

| | | | | |
|---|---|---|---|---|
| 2,943,449 | A | * | 7/1960 | Kurti ...................... F02K 1/78 60/799 |
| 4,466,587 | A | * | 8/1984 | Dusa ....................... B64C 7/02 244/1 N |
| 4,537,026 | A | * | 8/1985 | Nightingale ............ F02K 1/825 239/127.3 |
| 8,365,515 | B2 | | 2/2013 | Migliaro, Jr. |

(Continued)

*Primary Examiner* — Steven M Sutherland
(74) *Attorney, Agent, or Firm* — Patterson + Sheridan, LLP

(57) ABSTRACT

A fan nacelle, a gas turbine engine cell assembly, and an aircraft are provided. The fan nacelle includes a fan duct skin arranged in a fan duct to direct airflow from the fan of a Turbofan engine toward a fan nozzle. An exterior skin of the fan nacelle directs air flow around an exterior of the engine. The fan duct skin and the exterior skin terminate at a trailing edge, and a trailing edge portion of the exterior skin is one of parallel to and diverging from a trailing edge portion of the fan duct skin in an aft direction. In certain aspects, the trailing edge portion of the exterior skin is actuatable or inflatable to selectively divert from the trailing edge portion of the fan duct skin.

20 Claims, 6 Drawing Sheets

(56) References Cited

U.S. PATENT DOCUMENTS

| | | | |
|---|---|---|---|
| 2008/0163606 A1* | 7/2008 | Cini | F02K 1/09 60/204 |
| 2010/0221102 A1* | 9/2010 | Dawson | F02K 1/386 415/144 |
| 2013/0327886 A1* | 12/2013 | James | B64D 29/02 244/54 |
| 2014/0202164 A1 | 7/2014 | Cerra et al. | |

* cited by examiner

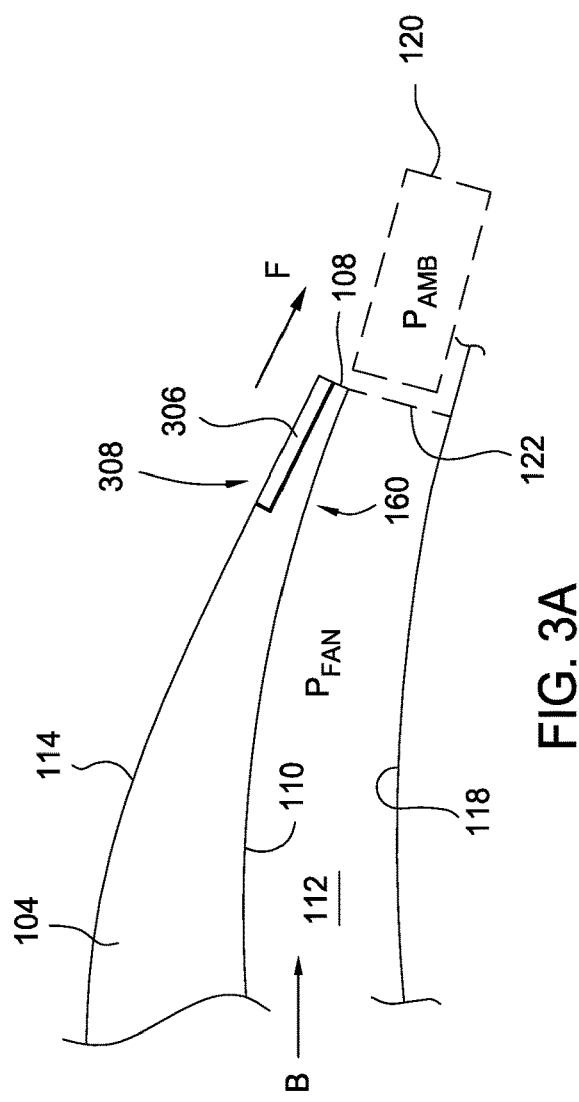
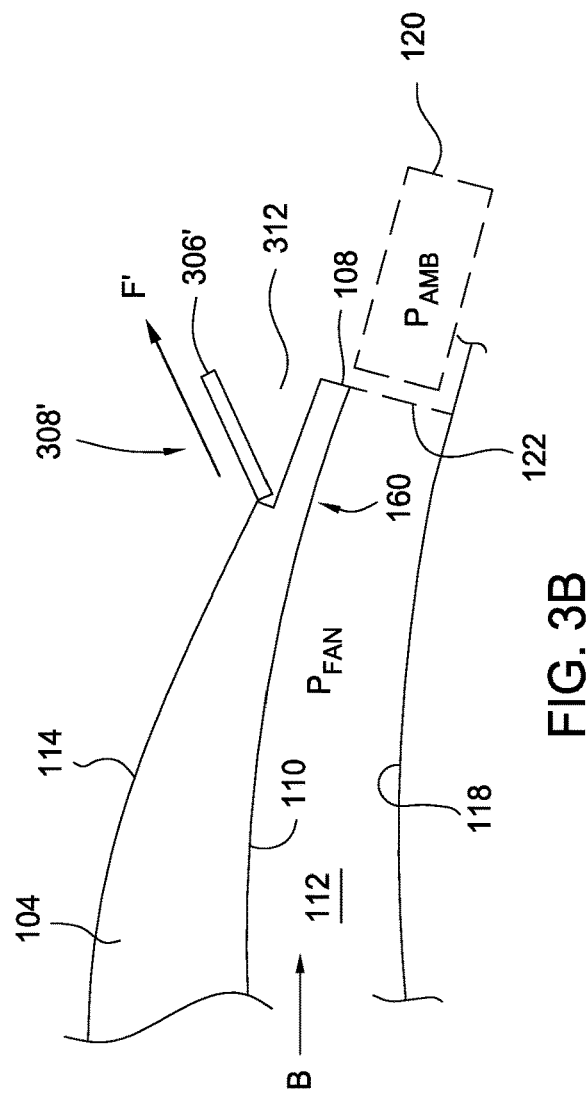

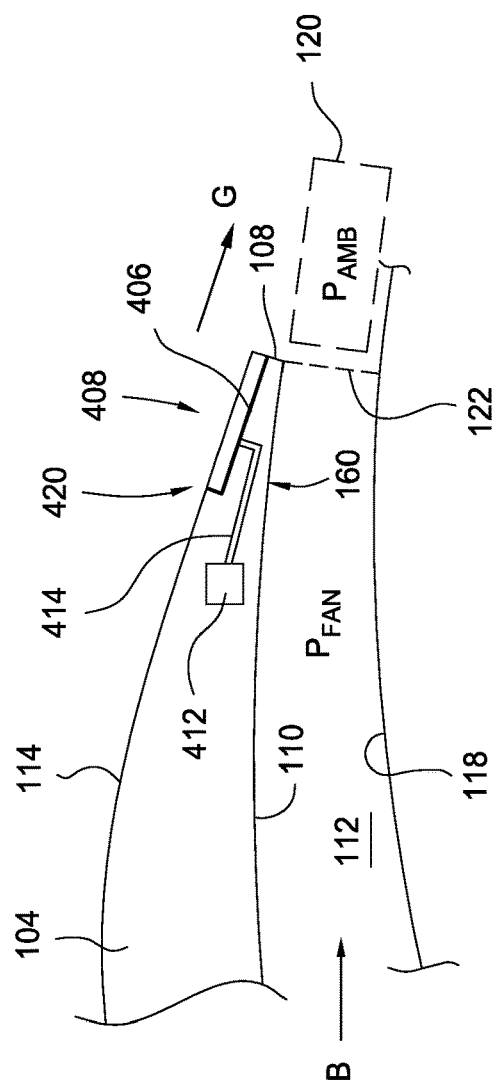
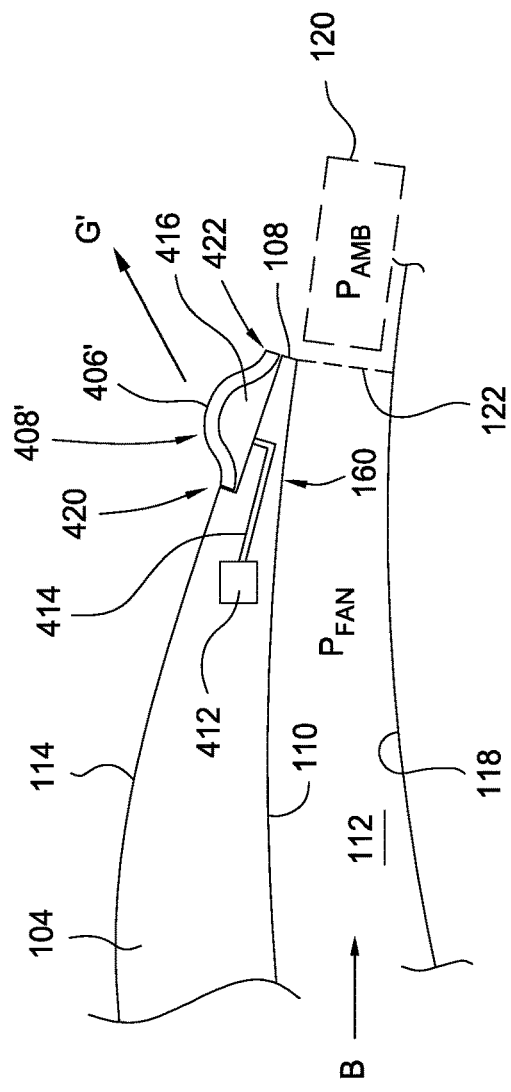
FIG. 4A
FIG. 4B

FAN NACELLE TRAILING EDGE

BACKGROUND

A turbofan engine is a gas turbine engine that includes a fan arranged at the front of the gas turbine engine. Some of the air passing through the fan is directed into a core of the gas turbine engine. The remainder of the air bypasses the core through a fan duct that surrounds the core. The fan duct includes a location with a minimum cross-sectional area, referred to as a nozzle. During certain flight conditions, a pressure ratio across the nozzle may be insufficient, causing a momentary fan stall.

SUMMARY

According to one aspect, a fan nacelle for a turbofan gas turbine engine comprises a fan duct skin arranged in a fan duct to direct airflow from a fan of the turbofan engine toward a fan duct nozzle. The fan nacelle also comprises an exterior skin arranged to direct airflow around an exterior of the turbofan gas turbine engine. The fan duct skin and the exterior skin terminate at a trailing edge. A trailing edge portion of the exterior skin is one of parallel to and diverging from a trailing edge portion of the fan duct skin in an aft direction.

According to one aspect, a gas turbine engine nacelle assembly comprises a core nacelle of a gas turbine engine and a fan nacelle disposed around the core nacelle. The fan nacelle includes a leading edge and a trailing edge. The fan nacelle includes a fan duct skin arranged between the leading edge and the trailing edge. The core nacelle and the fan duct skin define a fan duct there-between. The fan duct includes a fan nozzle. The fan nacelle includes an exterior skin arranged between the leading edge and the trailing edge to direct airflow around an exterior of the gas turbine engine. The fan duct skin and the exterior skin terminate at the trailing edge. A trailing edge portion of the exterior skin is one of parallel to and diverging from a trailing edge portion of the fan duct skin in an aft direction.

According to one aspect, an aircraft comprises a fuselage, a wing, and a gas turbine engine arranged relative to the fuselage and the wing. The gas turbine engine comprises a core nacelle and a fan nacelle disposed around the core nacelle. The fan nacelle includes a leading edge and a trailing edge. The fan nacelle includes a fan duct skin arranged between the leading edge and the trailing edge. The core nacelle and the fan duct skin define a fan duct there-between. The fan duct includes a fan nozzle. The fan nacelle includes an exterior skin arranged between the leading edge and the trailing edge to direct airflow around an exterior of the gas turbine engine. The fan duct skin and the exterior skin terminate at the trailing edge. A trailing edge portion of the exterior skin is one of parallel and diverging from a trailing edge portion of the fan duct skin in an aft direction.

BRIEF DESCRIPTION OF THE SEVERAL VIEWS OF THE DRAWINGS

FIG. 3A is a side view of a trailing edge of a fan nacelle for the gas turbine engine of FIG. 1A, wherein the trailing edge includes a movable member illustrated in a stowed position;

FIG. 3B is a side view of the trailing edge of FIG. 3A, wherein the movable member is illustrated in a deployed position;

FIG. 4A is a side view of a trailing edge of a fan nacelle the gas turbine engine of FIG. 1A, wherein the trailing edge includes an inflatable member illustrated in an uninflated state;

FIG. 4B is a side view of the trailing edge of FIG. 4A, wherein the inflatable member is illustrated in an inflated state.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In aspects described herein, a trailing edge of a fan nacelle for a gas turbine engine includes a stationary or movable exterior surface that diverts air flowing over an exterior of the fan nacelle away from a region downstream of a fan duct of the gas turbine engine. Diverting this air decreases air pressure in the region downstream of the fan duct. The reduced pressure of this region results in an increased fan pressure ratio across a nozzle of the fan duct, thereby improving airflow through the fan duct and reducing the likelihood that the fan of the turbofan engine experiences a momentary fan stall.

Figure 1A:
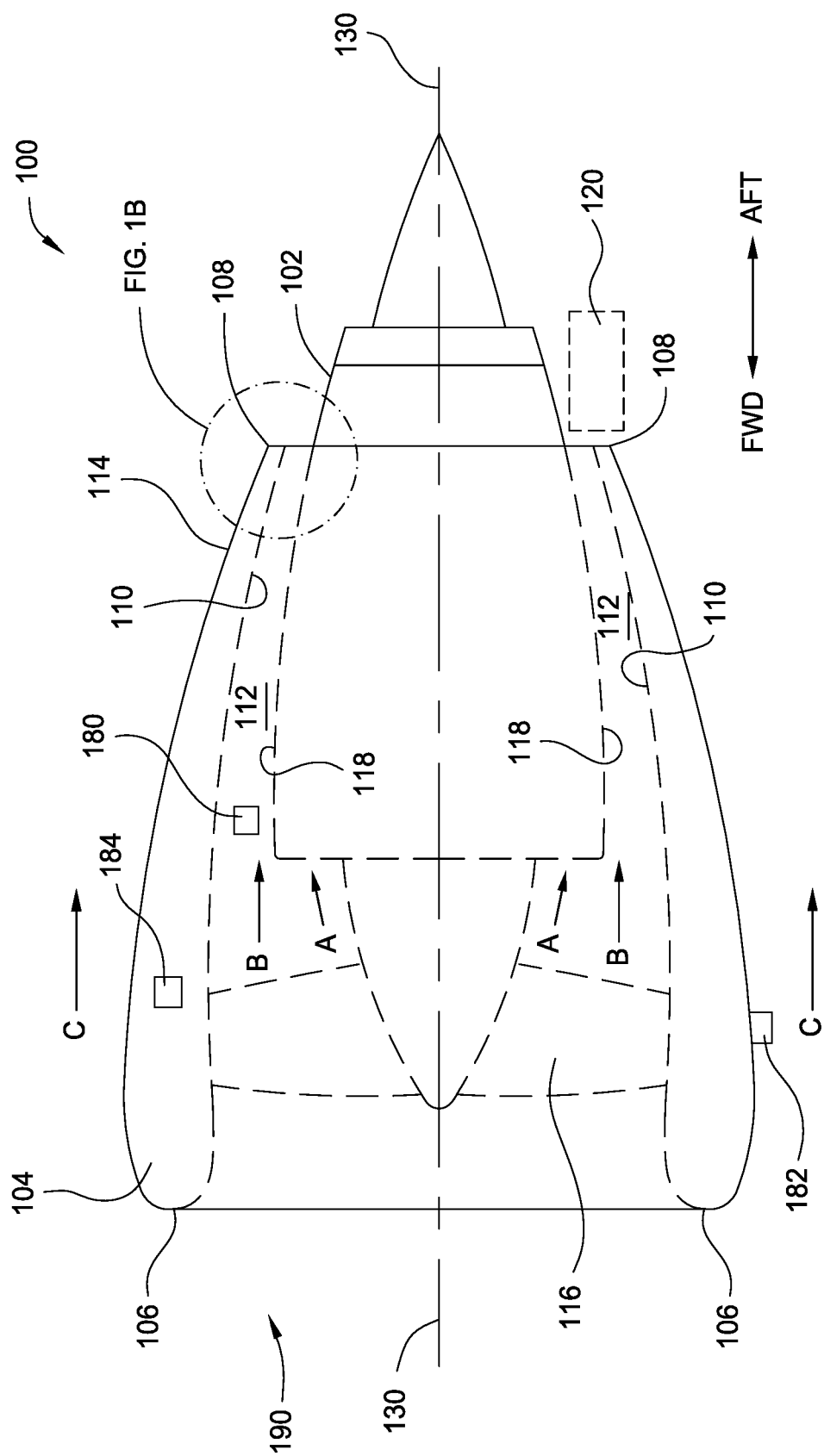
FIG. 1A is a schematic side view of a gas turbine engine.

FIG. 1A is a side view of a gas turbine engine 100 according to one aspect, wherein certain features that would be blocked from view are illustrated in broken line. The gas turbine engine 100 includes an engine core 102 surrounded by a core nacelle 118. Components of the engine core 102 rotate about a longitudinal axis 130 to power a fan 116 arranged in front of the engine core 102. The fan 116 is surrounded by a fan nacelle 104. The core nacelle 118 and the fan nacelle 104 comprise a gas turbine engine nacelle assembly 190. A portion of the air passing the fan 116 enters the engine core 102 (as indicated by arrows A) and the remainder of the air passing the fan 116 enters a fan duct 112 (as indicated by arrows B). The fan 116, during operation, rotates to drive air into the fan duct 112, thereby increasing the pressure of the air in the fan duct 112 over ambient air pressure, such as the air pressure in the region 120 aft of the fan duct 112. The increased pressure of the air in the fan duct 112 divided by the pressure of the air in the region 120 aft of the fan duct 112 defines a fan pressure ratio. Airflow through the fan duct 112 is a function of the fan pressure ratio. As the fan pressure ratio decreases toward the value of 1, airflow through the fan duct 112 decreases and the likelihood of a fan stall increases. A fan stall is a momentary cessation or reversal of airflow through the fan.

The fan nacelle 104 includes a leading edge 106 and a trailing edge 108 the fan nacelle 104 also includes a fan duct skin 110 arranged in the fan duct 112. The fan nacelle 104 also includes an exterior skin 114 arranged to direct airflow around an exterior of the gas turbine engine 100 (indicated by arrows C). The fan duct skin 110 and the exterior skin 114 terminate at the trailing edge 108.

Figure 1B:
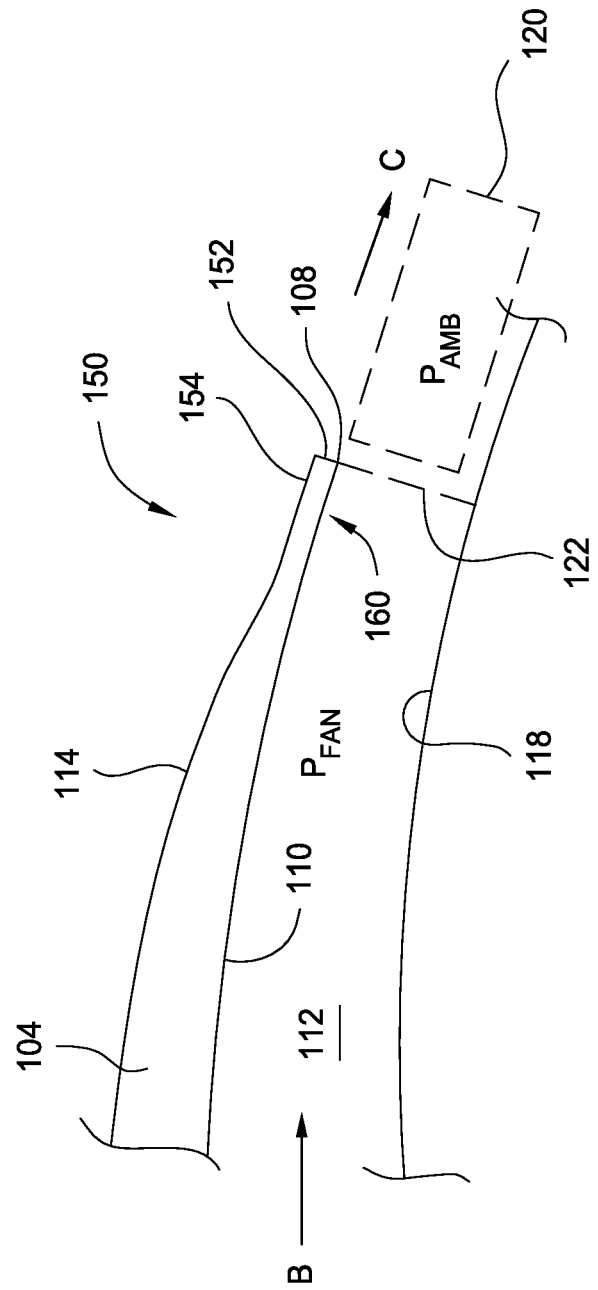
FIG. 1B is a side view of a trailing edge of a fan nacelle for the gas turbine engine of FIG. 1A according to one aspect.

FIG. 1B is a detail side view of a trailing edge 108 of a portion of the fan nacelle 104. As shown in FIG. 1B, the fan duct 112 is defined by the core nacelle 118 and the fan duct skin 110 of the fan nacelle 104. In the aspect illustrated in FIG. 1B, the fan duct 112 defines a nozzle 122 that is aligned with the trailing edge 108 of the fan nacelle 104. In various other aspects, the nozzle 122 of the fan duct 112 maybe located upstream of the trailing edge 108 of the fan nacelle 104. Again, the nozzle 122 defines a narrowest flow area through the fan duct 112. A pressure $P_{FAN}$ upstream of the nozzle 122 divided by a pressure $P_{AMB}$ in the region 120 aft of the fan duct 112 and downstream of the nozzle 122 defines the fan pressure ratio.

In the aspect illustrated in FIG. 1B, the fan duct skin 110 includes a trailing edge portion 160 that converges toward the core nacelle 118 in the aft direction. The exterior skin 114 includes a trailing edge portion 150 that includes a surface 154 that is parallel with respect to the trailing edge portion 160 of the fan duct skin 110. As a result, the trailing edge 108 of the fan nacelle 104 includes a blunt end 152. The parallel surface 154 of the trailing edge portion 150 of the exterior skin 114 diverts airflow away from the region 120 aft of the fan duct 112 compared to a trailing edge portion 150 that converges with the fan duct skin 110 all the way to the trailing edge 108. By diverting the airflow away from the region 120 aft of the fan duct 112, the pressure $P_{AMB}$ in the region 120 and downstream of the nozzle 122 is reduced. Further, the resulting blunt end 152 creates a low-pressure region immediately aft of the blunt end 152 and outboard of the nozzle 122. This low pressure outboard of the nozzle 122 also decreases the pressure $P_{AMB}$ in the region 120 aft of the fan duct 112.

Figure 2A:
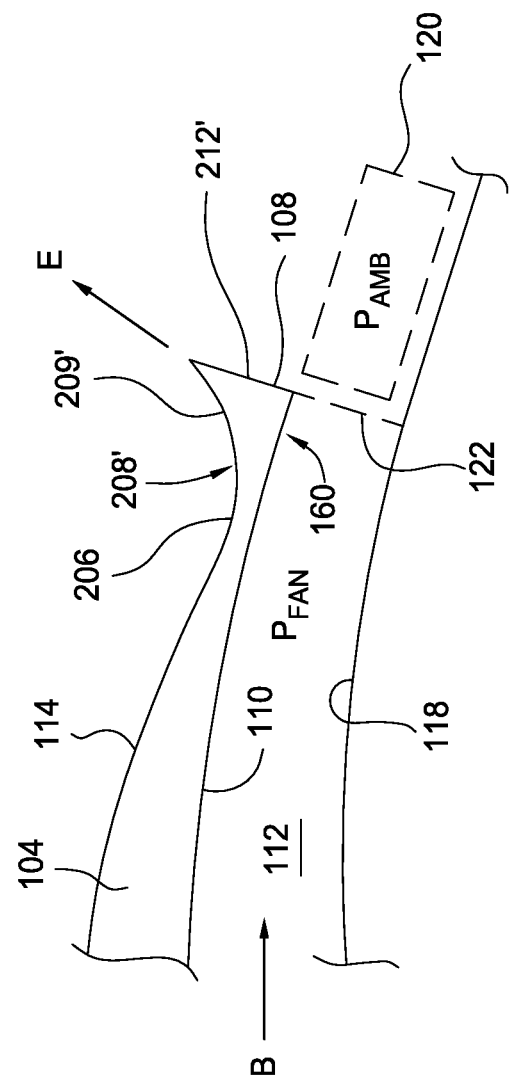
FIG. 2A is a side view of a trailing edge of a fan nacelle for the gas turbine engine of FIG. 1A according to another aspect.

FIG. 2A is a detail side view of a trailing edge 108 of a fan nacelle 104 according to another aspect. The fan nacelle 104 includes an exterior skin 114 with a trailing edge portion 208 that includes a surface 209 that diverges from a trailing edge portion 160 of the fan duct skin 110 in the aft direction. The exterior skin 114 includes an inflection point 206. At locations upstream of the inflection point 206, the exterior skin 114 converges toward the fan duct skin 110 in the aft direction. At locations downstream of the inflection point 206, the exterior skin 114 diverges from the fan duct skin 110 in the aft direction. Relative to the aspect shown in FIG. 1B in which the trailing edge portions 150 and 160 of the exterior skin 114 and fan duct skin 110 are parallel with respect to each other, the diverging surface 209 of the trailing edge portion 208 of the exterior skin 114 diverts airflow away from the region 120 after the fan duct 112 to a greater degree, as indicated by arrow D. Furthermore, the diverging surface 209 of the trailing edge portion 208 of the exterior skin 114 results in a larger blunt end 212, resulting in a larger low-pressure region aft of the trailing edge 108.

As a result of the larger low-pressure region and the greater diversion of airflow away from the region 120 aft of the fan duct 112, the diverging surface 209 results in a lower pressure $P_{AMB}$ in the region 120 than the parallel trailing edge portions 150 and 160 illustrated in FIG. 1B. However, the fan nacelle 104 with the diverging surface 209 illustrated in FIG. 2A may result in increased drag relative to the fan nacelle 104 with the parallel trailing edge portions 150 and 160 illustrated in FIG. 1B.

Figure 2B:
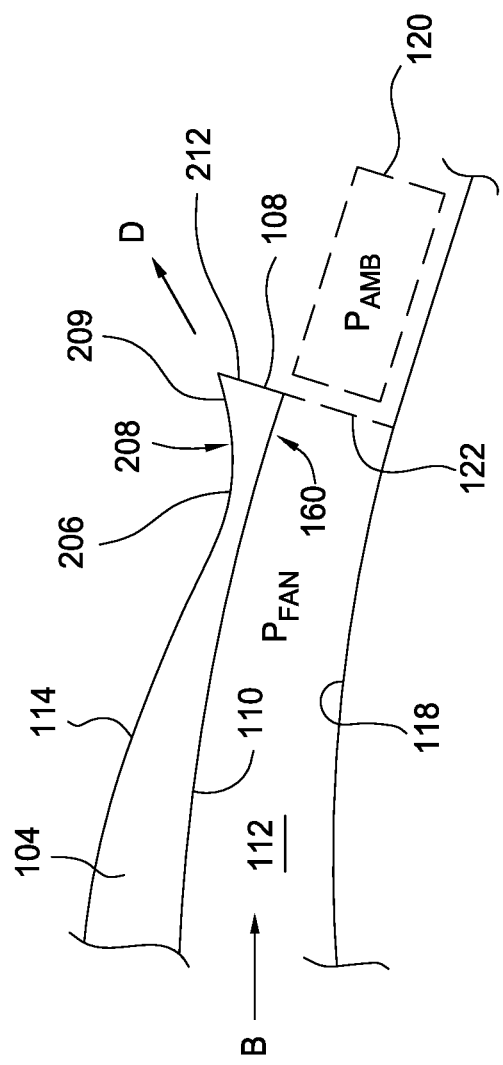
FIG. 2B is a side view of a trailing edge of a fan nacelle for the gas turbine engine of FIG. 1A according to yet another aspect.

In the aspect illustrated in FIG. 2A, the diverging surface 209 of the trailing edge portion 208 of the exterior skin 114 diverges from the trailing edge portion 160 of the fan duct skin 110 in a linear manner. FIG. 2B illustrates another aspect in which a trailing edge portion 208' includes a diverging surface 209' that diverges in a nonlinear manner. Specifically, the diverging surface 209' diverges at greater angles at greater distances from the inflection point 206 in the aft direction. The diverging surface 209' results in even greater diversion of airflow away from the region 120 aft of the fan duct 112 (indicated by arrow E) and an even larger low-pressure region 212' aft of the trailing edge 108. As a result of the even larger low-pressure region and the greater diversion of airflow, the diverging surface 209' may result in an even lower pressure $P_{AMB}$ in the region 120 than the diverging surface 209 illustrated in FIG. 2A. However, the fan nacelle 104 with the diverging surface 209' may result in even more increased drag relative to the fan nacelle 104 with the linear diverging surface 209 illustrated in FIG. 2A or the fan nacelle 104 with the parallel trailing edge portions 150 and 160 illustrated in FIG. 1B.

In the above-described exemplary fan nacelles 104 with parallel or diverging trailing edge portions 150, the pressure $P_{AMB}$ in the region 120 aft of the fan duct 112 is decreased. Assuming the pressure $P_{FAN}$ in the fan duct 112 remains the same, the resulting fan pressure ratio decreases, resulting in improved fan stall margin.

In the above-described exemplary aspects, the trailing edge 108 of the fan nacelle 104 is modified in a manner that reduces pressure in the region 120 behind the fan duct 112 but also increases aerodynamic drag of the fan nacelle 104. FIGS. 3A and 3B and FIGS. 4A and 4B illustrate aspects in which the fan nacelle 104 includes actuatable and inflatable portions, respectively, that decrease pressure in the region 120 aft of the fan duct 112 during phases of flight when the fan pressure ratio is relatively low or below a fan pressure ratio threshold but do not decrease pressure in the region 120 (and therefore do not increase drag) when the fan pressure ratio is not low or is below a fan pressure ratio threshold.

FIGS. 3A and 3B are detail side views of a trailing edge 108 of a fan nacelle 104 that includes a flap 306 in the trailing edge portion 308 of the exterior skin 114. The flap 306 is illustrated in a stowed position in FIG. 3A and the flap 306' is illustrated in a fully deployed position in FIG. 3B. In the stowed position, the flap 306 is flush with portions of the exterior skin 114 upstream of the trailing edge portion 308. As shown in FIG. 3A, air flowing over the exterior skin 114 is directed toward the region 120 aft of the fan duct 112 when the flap 306 is in the stowed position, as indicated by arrow F. When deployed, the flap 306' in the trailing edge portion 308' diverges from the trailing edge portion 160 of the fan duct skin 110. Further, the air flowing over the exterior skin 114 is diverted away from the region 120 aft of the fan duct 112, as indicated by arrow F'. Additionally, a low-pressure region is generated aft of the deployed flap 306', which also reduces the pressure $P_{AMB}$ in the region 120 aft of the fan duct 112.

The fan nacelle 104 generally has a cylindrical shape or a nearly cylindrical shape. Consequently, the flap 306 may comprise a plurality of flap segments arranged about a circumference of the trailing edge portion 308 of the fan nacelle. In certain applications, the flap segments may be spaced at particular intervals around the fan nacelle 104.

The flap 306 (or flap segments) is typically attached to the fan nacelle 104 via hinges or the like. The flap 306 (or flap segments) may be actuated between the stowed position and the deployed position via an actuator, such as a hydraulic piston, a pneumatic piston, a solenoid, an electric motor or a geometry-changing material, such as electroactive polymers. As noted above, the flap 306 may be manipulated between at least two positions—a fully stowed position as shown in FIG. 3A and a fully deployed position as shown in FIG. 3B. In such aspects, the flap 306 may be moved to the deployed position during phases of flight and/or conditions during which flight testing has demonstrated the fan pressure ratio to be low. For example, on certain aircraft, the fan pressure ratio is lowest during takeoff and climb phases of flight, and the flaps 306 may be moved to the deployed position during these phases of flight. In other aspects, the flap 306 may include many positions between a fully stowed position and a fully deployed position. In such aspects, the flap 306 may be moved to a particular position that achieves a predetermined minimum fan pressure ratio. In such aspects, the gas turbine engine 100 and/or an aircraft using the gas turbine engine 100 may be equipped with pressure sensors that enable calculation of the fan pressure ratio. Referring again to FIG. 1A, the gas turbine engine 100 includes a first pressure sensor 180 arranged in the fan duct 112 at a location upstream of the fan nozzle 122 that is operable to measure the pressure in the fan duct $P_{FAN}$. The gas turbine engine 100 also includes a second pressure sensor 182 arranged along an exterior of the fan nacelle 104 that measures ambient pressure $P_{AMB}$. A controller 184 for the gas turbine engine 100 is operable to receive data from the first pressure sensor 180 and the second pressure sensor 182 to calculate the fan pressure ratio. In the event the calculated fan pressure ratio drops below a predetermined threshold value, the controller 184 actuates the flap 306 (or flap segments) to lower the pressure $P_{AMB}$ in the region 120 aft of the fan duct 112 to increase the fan pressure ratio. In one aspect, the controller 184 can move the flap 306 between the fully stowed position shown in FIG. 3A and the fully deployed position shown in FIG. 3B to increase the fan pressure ratio. In another aspect, the controller 184 can move the flap 306 from the fully stowed position shown in FIG. 3A to a partially-deployed position to achieve a fan pressure ratio equal to or higher than the predetermined threshold value.

FIGS. 4A and 4B are detail side views of a trailing edge 108 of a fan nacelle 104 that includes an inflatable boot 406 in the trailing edge portion 408 of the exterior skin 114. The inflatable boot 406 is illustrated in an uninflated state in FIG. 4A and the inflatable boot 406' is illustrated in a fully inflated position in FIG. 4B. When this inflatable boot 406 is uninflated, the inflatable boot 406 is flush with portions of the exterior skin 114 upstream of the trailing edge portion 408. As shown in FIG. 4A, air flowing over the exterior skin 114 is directed toward the region 120 aft of the fan duct 112 when the inflatable boot 406 is in the uninflated state, as indicated by arrow G. When the inflatable boot 406' is inflated, a portion of the inflatable boot 406' in the trailing edge portion 408' diverges from the trailing edge portion 160 of the fan duct skin 110. When the inflatable boot 406' is inflated, the air flowing over the exterior skin 114 is diverted away from the region 120 aft of the fan duct 112, as indicated by arrow G'.

The inflatable boot 406 is attached in an airtight manner to a perimeter of the exterior skin 114 at a first location 420 and at a second location 422, creating an inflatable plenum 416 there-between. The inflatable plenum 416 communicates with a pressurized air source 412 (e.g., pressurized air from a bleed of the gas turbine engine 100) via one or more channels 414 in the fan nacelle 104. The inflatable boot 406 may be made from a rubber material or other flexible material. The inflatable boot 408 may be continuous about a perimeter of the exterior skin 114 of the fan nacelle 104. Alternatively, the inflatable boot 408 may comprise a plurality of inflatable boot segments arranged around the perimeter of the exterior skin 114 of the fan nacelle 104.

The inflatable boot 406 may include multiple inflated states to provide for varying degrees of air diversion and pressure drop in the region 120 aft of the fan duct 112. The controller 184 could measure the air pressure in the fan duct 112 using the first pressure sensor 180 and ambient air pressure using the second pressure sensor 182, and could command inflation of the inflatable boot 408 upon the fan pressure ratio dropping below the predetermined threshold value. Alternatively, the inflatable boot could be fully inflated whenever the fan pressure ratio drops below the predetermined threshold value or whenever the aircraft on which the gas turbine engine 100 is operating experiences phases of flight and/or flight conditions known to result in fan pressure ratios close to, at, or below the predetermined threshold value.

Figure 5:
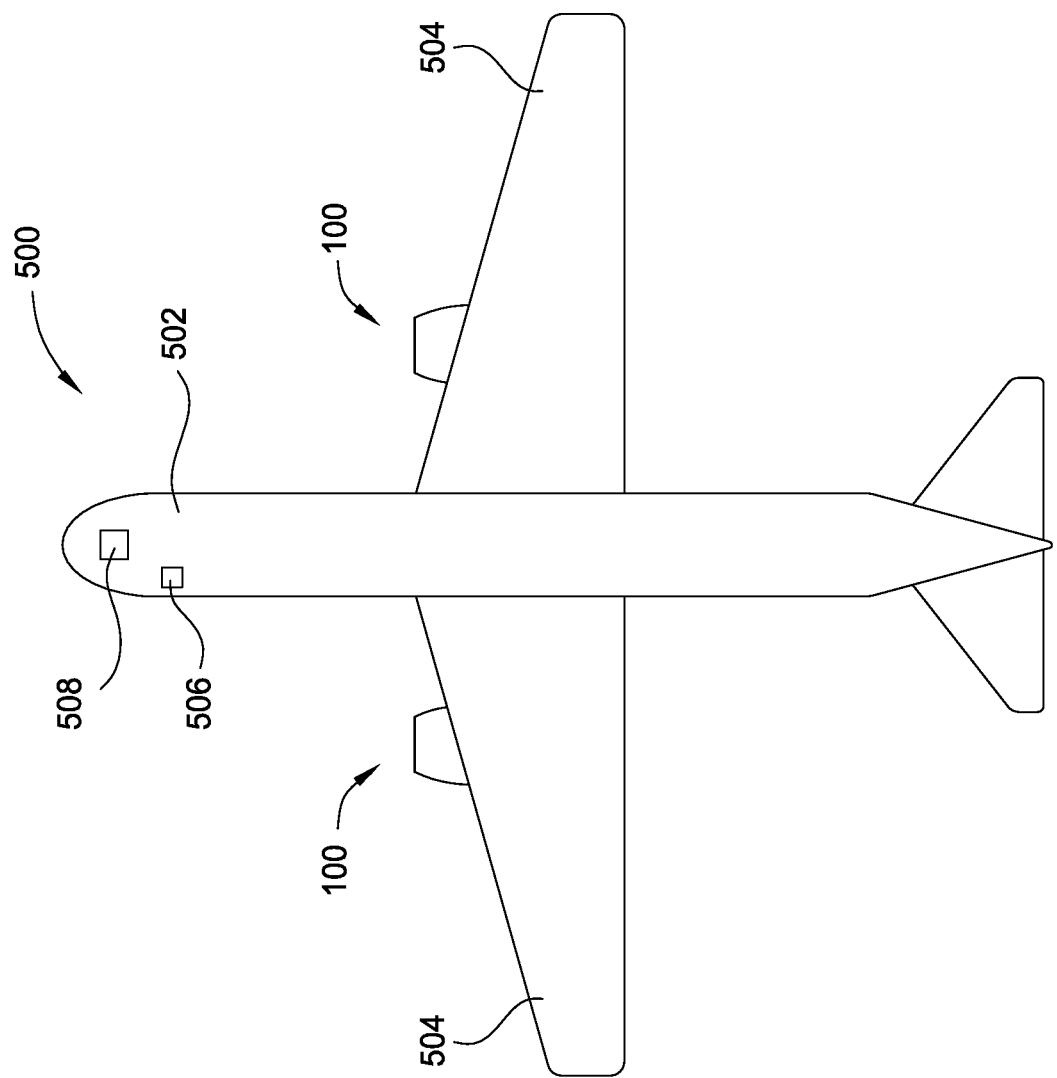
FIG. 5 is a top view of an aircraft comprising turbofan engines according to at least one aspect.

FIG. 5 is a top view of an aircraft 500 that includes a fuselage 502, wings 504, and gas turbine engines 100 according to at least one aspect mounted under the wings. In various other aspects, the gas turbine engines 100 could be mounted to the fuselage 502 behind the wings 504. The aircraft 500 includes an ambient pressure sensor 506, such as a static pressure sensor that is also used by avionics on board the aircraft. The ambient pressure sensor 506 could be used in lieu of or in combination with the second pressure sensor 182, discussed above with reference to FIG. 1, to calculate the fan pressure ratio.

The aircraft 500 also includes avionics 508. The avionics 508 are operable to detect flight conditions of the aircraft, including phases of flight for the aircraft. For example, the avionics 508 on modern aircraft include flight management computers that are programmed with waypoints, altitudes, and speeds for a particular flight. The avionics 508 also typically include a global positioning system (GPS) that allows for a precise determination of a location of the aircraft 500. Using this information (and possibly additional information from other avionics systems), the avionics 508 recognize a phase of flight for the aircraft 500. For example, the avionics 508 may recognize that the aircraft 500 is executing a takeoff roll along the runway, is climbing after takeoff, is cruising, is descending, or is landing. In at least one aspect, the avionics 508 can transmit a phase of flight status to the controller 184 such that the controller 184 only actuates the flap 306 to a deployed position or inflates the inflatable boot 406 in the event the fan pressure ratio drops below a predetermined threshold value and the phase of flight status indicates a phase of flight at which fan stall is more likely, such as a takeoff phase of flight or a climb phase of flight. In at least one aspect, the controller 184 may be omitted from the gas turbine engine 100, and the avionics 508 can control actuation of the flap 306 or inflation of the inflatable boot 406.

In the aspects described above, an exterior skin of a fan nacelle diverts air flowing over an exterior of the fan nacelle away from a region aft of a fan duct. Diverting the air away from the region reduces the air pressure behind the fan duct, thereby increasing a fan pressure ratio. The increased fan pressure ratio improves airflow through the fan duct and reduces the likelihood of a fan stall.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. A fan nacelle for a gas turbine engine, comprising:
   a fan duct skin arranged in a fan duct to direct airflow from a fan of the gas turbine engine toward a fan nozzle; and
   an exterior skin arranged to direct airflow around an exterior of the gas turbine engine, wherein the fan duct skin and the exterior skin couple together to define a rounded leading edge at a forward end of the fan nacelle and converge towards one another from the rounded leading edge to an aft end to terminate at a trailing edge of the fan nacelle, and wherein a trailing edge portion of the exterior skin is one of parallel to and diverging from a trailing edge portion of the fan duct skin.

2. The fan nacelle of claim 1, wherein the trailing edge portion of the exterior skin and the trailing edge portion of the fan duct skin are parallel with respect to each other.

3. The fan nacelle of claim 1, wherein the trailing edge portion of the exterior skin diverges from trailing edge portion of the fan duct skin in the aft direction.

4. The fan nacelle of claim 3, wherein the trailing edge portion of the exterior skin diverges at increasing angles from an inflection point toward the trailing edge.

5. The fan nacelle of claim 3, wherein the trailing edge portion of the exterior skin is actuatable to diverge from the trailing edge portion of the fan duct skin.

6. The fan nacelle of claim 3, wherein the trailing edge portion of the exterior skin is selectively inflatable to diverge from the trailing edge portion of fan duct skin.

7. A gas turbine engine nacelle assembly, comprising:
   a core nacelle of a gas turbine engine; and
   a fan nacelle disposed around the core nacelle, the fan nacelle including:
   a rounded leading edge and a trailing edge
   a fan duct skin arranged between the rounded leading edge and the trailing edge, the core nacelle and the fan duct skin defining a fan duct there-between, the fan duct including a fan nozzle; and
   an exterior skin arranged between the rounded leading edge and the trailing edge to direct airflow around an exterior of the gas turbine engine, the exterior skin and the fan duct skin converging toward one another from the rounded leading edge to the trailing edge and terminating at the trailing edge, wherein a trailing edge portion of the exterior skin is one of parallel to and diverging from a trailing edge portion of the fan duct skin in an aft direction.

8. The gas turbine engine nacelle assembly of claim 7, wherein the trailing edge portion of the exterior skin and the trailing edge portion of the fan duct skin are parallel with respect to each other.

9. The gas turbine engine nacelle assembly of claim 7, wherein the trailing edge portion of the exterior skin diverges from the trailing edge portion of the fan duct skin in the aft direction.

10. The gas turbine engine nacelle assembly of claim 9, wherein the trailing edge portion of the exterior skin diverges at increasing angles from an inflection point toward the trailing edge.

11. The gas turbine engine nacelle assembly of claim 9, wherein the trailing edge portion of the exterior skin is actuatable to diverge from the trailing edge portion of the fan duct skin.

12. The gas turbine engine nacelle assembly of claim 9, wherein the trailing edge portion of the exterior skin is selectively inflatable to diverge from the trailing edge portion of the fan duct skin.

13. The gas turbine engine nacelle assembly of claim 7, wherein the trailing edge portion of the exterior skin is one of actuatable and selectively inflatable to diverge from the trailing edge portion of the fan duct skin, wherein the gas turbine engine nacelle assembly further comprises:
   a first pressure sensor operable to measure air pressure in the fan duct upstream of the fan nozzle;
   a second pressure sensor operable to measure ambient air pressure; and
   a controller in communication with the first pressure sensor and the second pressure sensor, wherein the controller is operable to:
      calculate a fan pressure ratio defined by the measured air pressure in a fan flow path by the first pressure sensor divided by the measured ambient pressure by the second pressure sensor; and
      one of actuate and inflate the trailing edge portion of the exterior skin upon the calculated fan pressure ratio dropping below a threshold value.

14. An aircraft, comprising:
   a fuselage;
   a wing;
   a gas turbine engine arranged relative to the fuselage and the wing, wherein the gas turbine engine comprises:
   a core nacelle; and
   a fan nacelle disposed around the core nacelle, the fan nacelle including:
      a rounded leading edge and a trailing edge;
      a fan duct skin arranged between the rounded leading edge and the trailing edge, the core nacelle (118) and the fan duct skin defining a fan duct there-between, the fan duct including a fan nozzle; and
      an exterior skin arranged between the rounded leading edge and the trailing edge to direct airflow around an exterior of the gas turbine engine, the exterior skin and the fan duct skin converging toward one another from the rounded leading edge to the trailing edge and terminating at the trailing edge, wherein a trailing edge portion of the exterior skin is one of parallel to and diverging from a trailing edge portion of the fan duct skin in an aft direction.

15. The aircraft of claim 14, wherein the trailing edge portion of the exterior skin and the trailing edge portion of the fan duct skin are parallel with respect to each other.

16. The aircraft of claim 14, wherein the trailing edge portion of the exterior skin diverges from the trailing edge portion of the fan duct skin in the aft direction.

17. The aircraft of claim 16, wherein the trailing edge portion of the exterior skin diverges at increasing angles from an inflection point toward the trailing edge.

18. The aircraft of claim 16, wherein the trailing edge portion of the exterior skin is one of actuatable and selectively inflatable to diverge from the trailing edge portion of the fan duct skin.

19. The aircraft of claim 18, wherein the gas turbine engine further comprises:
   a first pressure sensor operable to measure air pressure in the fan duct upstream of the fan nozzle;
   a second pressure sensor operable to measure ambient air pressure; and
   a controller in communication with the first pressure sensor and the second pressure sensor, wherein the controller is operable to:
   calculate a fan pressure ratio defined by the measured air pressure in the fan duct by the first pressure sensor divided by the measured ambient pressure by the second pressure sensor; and
   one of actuate and inflate the trailing edge portion of the exterior skin upon the calculated fan pressure ratio dropping below a threshold value.

20. The aircraft of claim 19, wherein the aircraft further comprises avionics operable to indicate a phase-of-flight status to the controller, and wherein the controller is operable to one of actuate and inflate the trailing edge portion of the exterior skin upon the indicated phase-of-flight status being one of a takeoff phase of flight and a climb phase of flight.

* * * * *

UNITED STATES PATENT AND TRADEMARK OFFICE
CERTIFICATE OF CORRECTION

PATENT NO.        : 10,961,950 B2
APPLICATION NO.   : 15/342694
DATED             : March 30, 2021
INVENTOR(S)       : Howe Page 1 of 1

It is certified that error appears in the above-identified patent and that said Letters Patent is hereby corrected as shown below:

In the Claims

Column 8, Line 55, Claim 14, after "nacelle" delete "(118)".

Signed and Sealed this
Twentieth Day of July, 2021

Drew Hirshfeld
*Performing the Functions and Duties of the
Under Secretary of Commerce for Intellectual Property and
Director of the United States Patent and Trademark Office*